(12) United States Patent
Li

(10) Patent No.: US 11,275,924 B2
(45) Date of Patent: Mar. 15, 2022

(54) EYE-PROTECTION MODE PROCESSING METHOD, DEVICE, TERMINAL AND COMPUTER-READABLE STORAGE MEDIUM IN FINGERPRINT RECOGNITION MODE

(71) Applicant: Beijing Xiaomi Mobile Software Co., Ltd., Beijing (CN)

(72) Inventor: Rui Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/003,178

(22) Filed: Aug. 26, 2020

(65) Prior Publication Data

US 2021/0334510 A1 Oct. 28, 2021

(30) Foreign Application Priority Data

Apr. 24, 2020 (CN) .......................... 202010333888

(51) Int. Cl.
*G06K 9/20* (2006.01)
*G06K 9/00* (2022.01)
*G06K 9/46* (2006.01)

(52) U.S. Cl.
CPC ....... *G06K 9/00067* (2013.01); *G06K 9/0004* (2013.01); *G06K 9/00973* (2013.01); *G06K 9/4652* (2013.01)

(58) Field of Classification Search
CPC ... G06K 9/00006–0012; G09G 2320/02–0295
See application file for complete search history.

(56) References Cited

U.S. PATENT DOCUMENTS

2019/0189040 A1   6/2019  Shin
2019/0278967 A1*  9/2019  Shepelev ................. G09G 3/32
2020/0394945 A1  12/2020  Shin

FOREIGN PATENT DOCUMENTS

CN            109794061 A  *  5/2019  ............. A63F 13/52

OTHER PUBLICATIONS

Extended European Search Report dated Feb. 16, 2021 in European Patent Application No. 20195193.6, 11 pages.

* cited by examiner

*Primary Examiner* — Brian Werner
(74) *Attorney, Agent, or Firm* — Oblon, McClelland, Maier & Neustadt, L.L.P.

(57) ABSTRACT

The present disclosure provides an eye-protection mode processing method, device, terminal, and medium in a fingerprint recognition mode. The method can include acquiring eye-protection parameters of each one of current constituent windows in the case of that a mobile terminal is in a fingerprint recognition mode, and, if the eye-protection parameters of the constituent window are preset values and the constituent window is a constituent window corresponding to fingerprint recognition, then setting the eye-protection parameters of the constituent window corresponding to the fingerprint recognition as a value of zero.

12 Claims, 2 Drawing Sheets

EYE-PROTECTION MODE PROCESSING METHOD, DEVICE, TERMINAL AND COMPUTER-READABLE STORAGE MEDIUM IN FINGERPRINT RECOGNITION MODE

CROSS-REFERENCE TO RELATED APPLICATIONS

This application is based upon and claims priority to Chinese Patent Application No. CN 202010333888.6, filed on Apr. 24, 2020, the entire contents of which are incorporated herein by reference.

TECHNICAL FIELD

The present application generally relates to the technical field of mobile terminals, and includes an eye-protection mode processing method, device, terminal, and medium in a fingerprint recognition mode.

BACKGROUND

Mobile terminals, such as mobile phones and tablet computers, are common information communication tools in daily life. People browse webpages, obtain information, and play games through these mobile terminals. However, with the popularity of mobile terminals, on the one hand, information security issues have become increasingly prominent. For this reason, various information security measures and solutions have emerged one after another. Among them, setting Fingerprint On Display (FOD) password is now a widely used encryption technology. On the other hand, as users use mobile terminals for an extended period of time every day, which will cause adverse effects on human vision, the eye-protection mode of mobile terminals has been applied for this purpose.

Because FOD need to use a bright and clear window to detect whether the user's fingerprint matches, but when the eye-protection mode is turned on, all windows including the FOD window will be changed to a color involving eye protection, which greatly reduces the fingerprint recognition rate, even sometimes the recognition fails. Therefore, in the related art, when the FOD is turned on, the eye-protection mode needs to be turned off, and the eye-protection mode can be turned on only after the fingerprint recognition is completed.

SUMMARY

When switching between the fingerprint recognition and the eye-protection mode, the screen of the mobile terminal can flicker. This can affect the continuity display of the eye protection function. According to a first aspect of the present disclosure, there is provided an eye-protection mode processing method in a fingerprint recognition mode. The method can include acquiring eye-protection parameters of each one of current constituent windows in the case of that a mobile terminal is in a fingerprint recognition state, and, if the eye-protection parameters of the constituent window are preset values and the constituent window is a constituent window corresponding to fingerprint recognition, then setting the eye-protection parameters of the constituent window corresponding to the fingerprint recognition as a value of zero.

According to a second aspect of the present disclosure, there is provided an eye-protection mode processing device in a fingerprint recognition model. The device can include an acquiring module that is configured to acquire eye-protection parameters of each one of current constituent windows in the case of that a mobile terminal is in a fingerprint recognition state, and filtering module that is configured to if the eye-protection parameters of the constituent window are preset values and the constituent window is a constituent window corresponding to fingerprint recognition, then set the eye-protection parameters of the constituent window corresponding to the fingerprint recognition as a value of zero.

According to a third aspect of the present disclosure, there is provided a mobile terminal. The mobile terminal can include a processor and a memory for storing at least one instruction, at least one program, code set or instruction set. The instruction, the program, the code set or the instruction set can be loaded and executed by the processor to implement the steps of the eye-protection mode processing method in a fingerprint recognition mode according to the first aspect described above.

According to a fourth aspect of the present disclosure, there is provided a non-transitory computer-readable storage medium, where the computer-readable storage medium storing one or more programs, and the one or more programs can be executed by one or more processors to implement the steps of the eye-protection mode processing method in a fingerprint recognition mode according to the first aspect described above.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION

In order to enable those skilled in the art to better understand the solution of the disclosure, the technical solutions in the embodiments of the disclosure will be clearly and completely described below in conjunction with the drawings in the embodiments of the disclosure. Obviously, the described embodiments are only a part of the embodiments of this disclosure, but not all the embodiments. Based on the embodiments in the disclosure, all other embodiments obtainable by those of ordinary skill in the art shall fall within the protection scope of this disclosure.

The terms "first", "second", "third", "fourth", etc. (if any) in the description and claims of this disclosure and the above-mentioned drawings are used to distinguish similar objects, and do not need to be used to describe a specific order or sequence. It should be understood that the data used in this way can be interchanged under appropriate circumstances, so that the described embodiments of the present disclosure can be implemented in a sequence other than those illustrated or described herein.

In addition, the terms "including" and "having" and any variations of them are intended to cover non-exclusive inclusion. For example, a process, method, system, product, or device that includes a series of steps or modules is not necessarily limited to those clearly listed steps or modules, and may include other steps or modules that are not clearly listed or are inherent to these processes, methods, products, or equipment.

The technical terms involved in the embodiments of this disclosure are as follows:

Graphics Processing Unit (GPU): a microprocessor used for image operations, it can map graphics to corresponding pixel points, calculate each pixel point, and output after determining the final color.

Open Graphics Library (Open GL): a cross-language and cross-platform application programming interface for rendering 2D and 3D vector graphics. This interface consists of nearly 360 different function calls, which can draw simple graphics and complex three-dimensional scenes.

Surface Flinger: an independent system service that receives Surface of all windows as input, and calculates the position of each Surface in the final Synthetic image based on parameters such as ZOrder, transparency, size, and position. In turn, the final display Buffer is generated by HW Composer or Open GL for display on a specific display device.

Fragment Shader: it is used to process each fragment generated in the rasterization stage, and finally calculate the final color of each pixel point.

In order to facilitate the understanding of the eye-protection mode processing method in the fingerprint recognition mode provided by the embodiment of the present disclosure, the principle of Surface Flinger in the Android system is introduced below.

Figure 1:
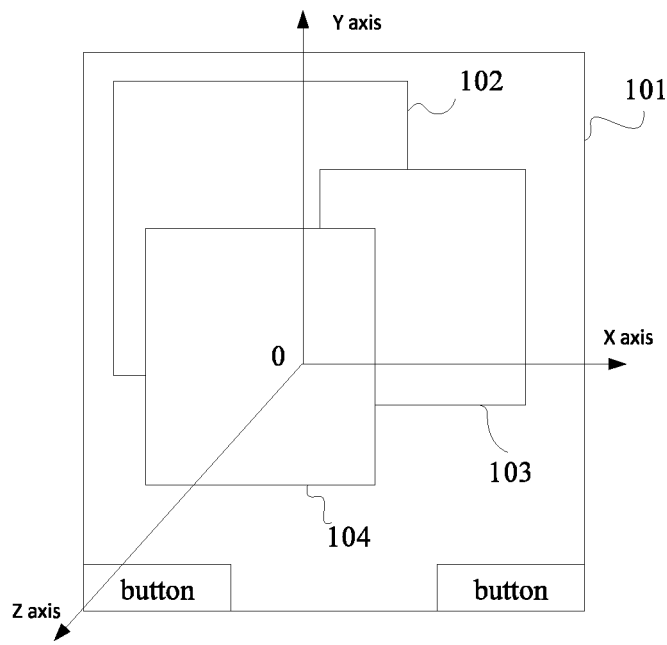
FIG. 1 is an exploded schematic diagram of an application program interface provided according to an embodiment of the disclosure.
Figure 2:
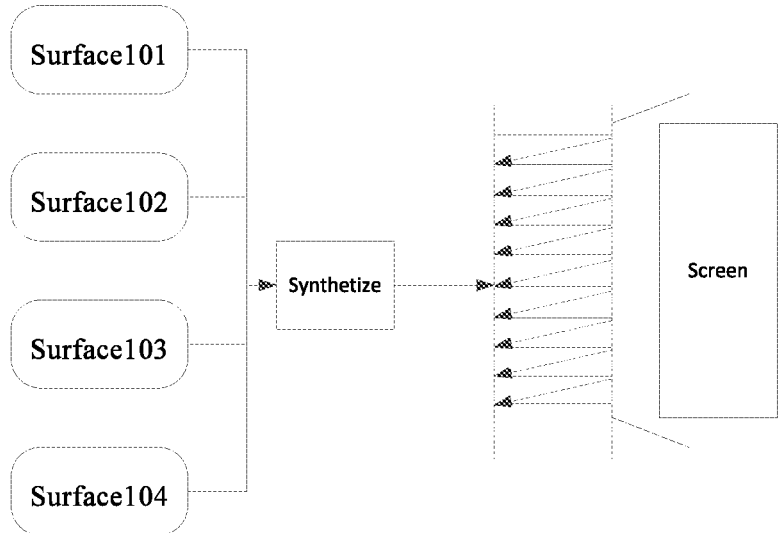
FIG. 2 is a synthesis schematic diagram of an application program interface provided according to an embodiment of the disclosure.

In fact, each application may correspond to one or more graphical interfaces, and each interface is called a Surface. An exploded schematic diagram of an application interface provided by an embodiment of this disclosure is shown in FIG. 1. It can be seen that there are 4 Surfaces in FIG. 1, respectively Surface101, Surface102, Surface103, and Surface104, wherein Surface101 is a Home interface, and two buttons are actually content inside the Home Surface. Further, as shown in FIG. 2, Surface Flinger synthesizes the graphics in all Surface according to parameters such as ZOrder, transparency, size and position, and finally the synthesized graphic is submitted to a back buffer area of the screen where waiting for the arrival of the next vertical synchronization signal of the screen, so as to be displayed on the screen again.

In order to facilitate understanding and description, the following describes in detail the eye-protection mode processing method, device, terminal, and medium in the fingerprint recognition mode according to the embodiments of the present disclosure through FIGS. 3 to 6.

Figure 3:
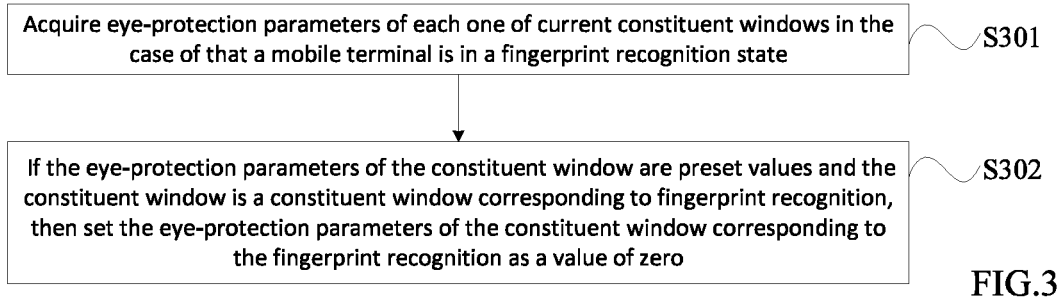
FIG. 3 is a schematic diagram of the basic flow of an eye-protection mode processing method in fingerprint recognition mode according to an embodiment of the disclosure.

Referring to FIG. 3, which is a schematic diagram of a basic flow chart of an eye protection mode processing method in a fingerprint recognition mode according to an embodiment of the application. The method includes the following steps.

At a step S301, eye-protection parameters of each of current constituent windows are obtained in the case of that a mobile terminal is in a fingerprint recognition state. It should be noted that the eye-protection mode processing method in the fingerprint recognition mode of the embodiment of the present disclosure can be used in a mobile terminal that supports Fingerprint On Screen. The fingerprint recognition methods may include, but are not limited to, capacitive fingerprint recognition, optical fingerprint recognition, and ultrasonic fingerprint recognition, and the like. The fingerprint recognition scenario can include, but is not limited to unlock page, payment page, and so on of the mobile terminal.

The following takes a scene of unlock page of the mobile phone as an example. First, a Picture Color Calibration (PCC) function is turned-off in a fingerprint recognition scene, and eye-protection parameters of the current PCC are passed to the Surface Flinger via an updatePccLevel function for saving. For example, the eye-protection parameters include three values of R (Red), G (Green) and B (Blue), and a value range of any one of the eye-protection parameters is a floating point number from 0 to 1.0. Then, the updateFodFlag function is called during a startup process of the fingerprint recognition to notify the Surface Flinger process that the saved RGB parameters need to be set to a drawing state. At this time, the eye-protection parameters of each of the constituent windows of the application program are detected, and the eye-protection parameters of the current constituent window are acquired.

At a step S302, if the eye-protection parameters of the constituent window are preset values and said constituent window is a constituent window corresponding to fingerprint recognition, the eye-protection parameters of the constituent window corresponding to the fingerprint recognition is set to zero.

For example, assuming that the preset values of RGB are 1.0, which means that the eye-protection mode is on, when the preset values of RGB are not 1.0, it means that the eye-protection mode is off, that is, the user does not need to use the eye-protection mode at this time. In actual detection, if the eye-protection parameters of the current constituent window are all the preset value 1.0, then the GPU synthesis mode is turned on, and the constituent window corresponding to the fingerprint recognition is filtered out, that is, the eye-protection parameters of the constituent window which has been filtered out are set to a value of zero; but for other one or more constituent windows whose eye-protection parameters are all preset values of 1.0 and which are not corresponding to the fingerprint recognition, one or more synthesis calculations of the eye-protection parameters are performed on all other one or more constituent windows, i.e., one or more constituent windows not corresponding to fingerprint recognition.

Further, in the embodiment of the present disclosure, a color value of each fragment in the fragment shader is calculated according to the eye-protection parameters obtained by the synthetic calculations, and a corresponding pixel point is rendered according to the color value of the each fragment. It should be noted that the fragment shader is a programmable interface provided by Open Graphics Library for processing pixels. For example, by using this interface, a variable gl_FragColor and the eye-protection parameters passed into the fragment shader can conduct a multiplication operation, that is, equation (1) equation (3).

$$gl\_FragColor.r^* = readingModePara.r; \quad (1)$$

$$gl\_FragColor.g^* = readingModePara.g; \quad (2)$$

$$gl\_FragColor.b^* = readingModePara.b; \quad (3)$$

Furthermore, calculation results of gl_FragColor can be returned to Open Graphics Library, and the operations that enabling the display of pixels are processed internally via Open Graphics Library, and finally pixels are displayed on the screen.

The embodiment of the disclosure provides an eye-protection mode processing method in fingerprint recognition mode. Since each of application programs corresponds to one or more constituent windows, when fingerprint recognition is started, eye-protection parameters of each of the constituent windows are detected one after another. If the eye-protection parameters of the current constituent window are preset values and the current constituent window is a constituent window corresponding to the fingerprint recognition, the eye-protection parameters of the constituent window corresponding to the fingerprint recognition are set to zero value. Therefore, the embodiment of the present disclosure can simultaneously turn on the eye-protection mode in the case of fingerprint recognition, avoiding the flickering of the screen of the mobile terminal which affects the continuous display of the eye protection function, while switching between the fingerprint recognition and the eye protection mode, and also eliminating the influence of the eye-protection mode on fingerprint recognition, therefore ensures the accuracy of fingerprint recognition.

Figure 4:
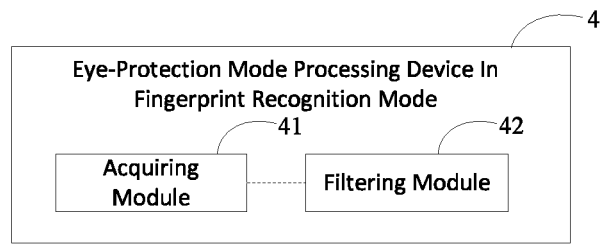
FIG. 4 is a schematic diagram of the basic structure of an eye-protection mode processing device in a fingerprint recognition mode according to an embodiment of the disclosure.

Based on the foregoing embodiment, a schematic diagram of the basic structure of an eye-protection mode processing device in a fingerprint recognition mode according to an embodiment of the disclosure in shown in FIG. 4. As shown in FIG. 4, the eye-protection mode processing device in the fingerprint recognition mode includes an acquiring module 41 and a filtering module 42. Of course, it should be understood that one or more of the modules described in this specification can be implemented by processing circuitry.

The acquiring module 41 is configured to acquire eye-protection parameters of each of current constituent windows in the case of that a mobile terminal is in a fingerprint recognition state.

The filtering module 42 is configured to if the eye-protection parameters of one of constituent windows are preset values (such as 1.0) and said constituent window is a constituent window corresponding to fingerprint recognition, then set the eye-protection parameters of the constituent window corresponding to the fingerprint recognition as a value of zero.

Further, in other embodiments of the present disclosure, the filtering module 42 is further configured to, if the eye-protection parameters of the constituent window are preset values (such as 1.0), and this constituent window is not the constituent window corresponding to the fingerprint recognition, then perform the synthetic calculations on the eye-protection parameters of this constituent window, i.e. the constituent window not corresponding to the fingerprint recognition.

Further, the method of synthesis calculations includes GPU synthesis.

Figure 5:
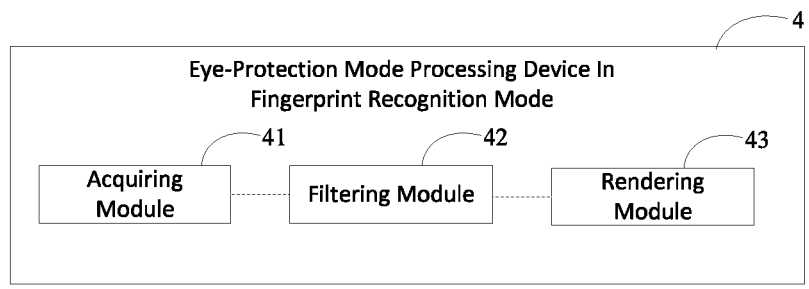
FIG. 5 is a schematic structural diagram of another eye-protection mode processing device in a fingerprint recognition mode according to an embodiment of the disclosure.

Further, in other embodiments of the present disclosure, as shown in FIG. 5, the eye-protection mode processing device 4 in the fingerprint recognition mode further includes a rendering module 43.

The rendering module 43 is configured to calculate a color value of each one of fragments in the fragment shader based on the eye-protection parameters obtained by the synthesis calculations, and render a corresponding pixel point according to the color value of the fragment.

It should be noted that, for the description of the same steps and the same content in this embodiment as those in other embodiments, reference may be made to the related description in other embodiments, and details are not repeated here.

The embodiment of the disclosure provides an eye-protection mode processing device in fingerprint recognition mode. Since each of application programs corresponds to one or more constituent windows, when fingerprint recognition is started, eye-protection parameters of each of the constituent windows are detected one after another. If the eye-protection parameters of the current constituent window are preset values and the current constituent window is a constituent window corresponding to the fingerprint recognition, the eye-protection parameters of the constituent window corresponding to the fingerprint recognition are set to zero value. Therefore, the embodiment of the present disclosure can simultaneously turn on the eye-protection mode in the case of fingerprint recognition, avoiding the flickering of the screen of the mobile terminal which affects the continuous display of the eye protection function, when switching between the fingerprint recognition and the eye protection mode, and also eliminating the influence of the eye-protection mode on fingerprint recognition, therefore ensures the accuracy of fingerprint recognition.

Figure 6:
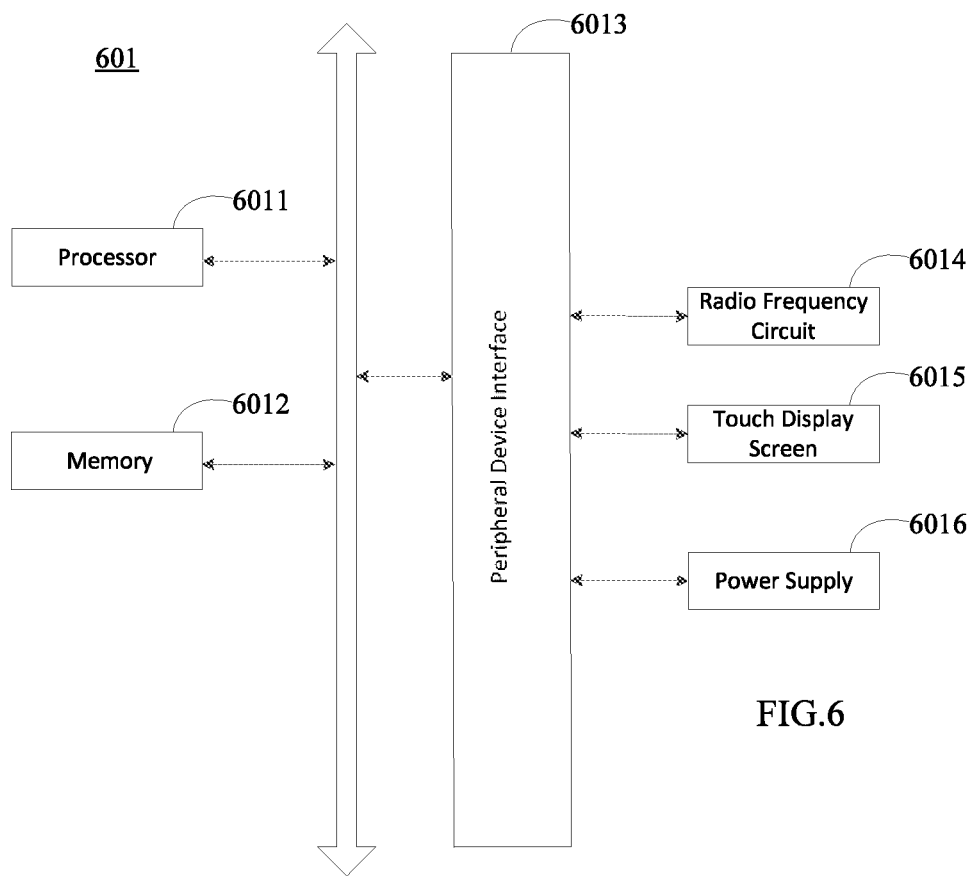
FIG. 6 is a structural block diagram of a mobile terminal according to an embodiment of the disclosure.

Based on the foregoing embodiment, referring to FIG. 6, which is a structural block diagram of a mobile terminal provided according to an embodiment of the disclosure. The mobile terminal 601 includes a processor 6011 and a memory 6012. The processor 6011 may include one or more processing cores, such as a 4-core processor, an 8-core processor, and so on. The processor 6011 can be implemented in at least one hardware form of Digital Signal Processing (DSP), Field Programmable Gate Array (FPGA), and Programmable Logic Array (PLA).

The processor 6011 may also include a main processor and a coprocessor. The main processor is a processor used to process data in an awake state, and is also called a central processing unit (CPU), and the coprocessor is a processor with low-power consumption used to process data in a standby state. In addition, the processor 6011 may be integrated with a graphics processor unit (GPU), and the GPU is used to render and draw content that needs to be displayed on the display screen. In some embodiments, the processor 6011 may further include an artificial intelligence (AI) processor, and the AI processor is used to process calculation operations related to machine learning.

The memory 6012 may include one or more non-transitory computer-readable storage media, which may be non-transitory. The memory 6012 may also include high-speed random access memory and non-volatile memory, such as one or more magnetic disk storage devices and flash memory storage devices. In some embodiments, the non-transitory computer-readable storage medium in the memory 6012 is used to store at least one instruction, and the at least one instruction is used to be executed by the processor 6011 to implement an eye-protection mode processing method in fingerprint recognition mode provided in the method embodiment of the present disclosure.

In some embodiments, the mobile terminal 601 may further include a peripheral device interface 6013 and at least one peripheral device. The processor 6011, the memory 6012, and the peripheral device interface 6013 may be connected by a bus or a signal line. Each of the peripheral devices can be connected to the peripheral device interface 6013 through a bus, a signal line or a circuit board.

For example, the peripheral devices include but are not limited to a radio frequency circuit 6014, a touch screen 6015, and a power supply 6016. The peripheral device interface 6013 may be used to connect at least one peripheral device related to an input/output (I/O) to the processor 6011 and the memory 6012. In some embodiments, the processor 6011, the memory 6012, and the peripheral device interface 6013 are integrated on the same chip or circuit board; in some other embodiments, any one or two of the processor 6011, the memory 6012, and the peripheral device interface 6013 can be implemented on separate chips or circuit boards, which are not limited in the embodiment of the present disclosure.

The radio frequency circuit 6014 is used to receive and transmit radio frequency (RF) signals, also called electromagnetic signals. The radio frequency circuit 6014 communicates with a communication network and other communication devices through electromagnetic signals. The radio frequency circuit 6014 converts electrical signals into electromagnetic signals for transmission, or converts received electromagnetic signals into electrical signals. Optionally, the radio frequency circuit 6014 includes an antenna system, an RF transceiver, one or more amplifiers, a tuner, an oscillator, a digital signal processor, a codec chipset, a user identity module card, and the like. The radio frequency circuit 6014 can communicate with other devices through at least one wireless communication protocol. The wireless communication protocol includes, but is not limited to, metropolitan area networks, various generations of mobile communication networks (2G, 3G, 4G and 5G), wireless local area networks and/or Wi-Fi networks. In some embodiments, the radio frequency circuit 6014 may also include a circuit related to Near Field Communication (NFC).

The display screen 6015 is used to display a user interface (UI). The UI can include graphics, text, icons, videos, and any combination thereof. When the display screen 6015 is a touch display screen, the display screen 6015 also has the ability to collect touch signals on or above the surface of the display screen 6015. The touch signal can be input to the processor 6011 as a control signal for processing. At this time, the display screen 6015 can also be used to provide virtual buttons and/or virtual keyboards, also called soft buttons and/or soft keyboards. In some embodiments, the display screen 6015 may be one display screen, which is arranged on a front panel of the mobile terminal 601. In other embodiments, the display screen 6015 may be at least two display screens, which are respectively arranged on different surfaces of the mobile terminal 601 or in a way of a folded design. In other embodiments, the display screen 6015 may be a flexible display screen, which is arranged on a curved surface or a folded surface of the mobile terminal 601. Moreover, the display screen 6015 can also be set as a non-rectangular irregular shape, that is, a special-shaped screen. The display screen 6015 can be made of liquid crystal display (LCD), organic light-emitting diode (OLED) and other materials.

Those skilled in the art can understand that the structure shown in FIG. 6 does not constitute a limitation on the mobile terminal 601, and may include more or fewer components than those shown in the figure, or combine some components, or adopt different component arrangements. It should be noted that the mobile terminal 601 involved in the embodiment of the present disclosure may include, but is not limited to, a personal digital assistant (PDA), a tablet computer, a wireless handheld device, and a mobile phone.

As another aspect, an embodiment of the present application provides a computer-readable storage medium for storing program code, and the program code is used to execute any implementation of an eye-protection mode processing method in the fingerprint recognition mode of the foregoing embodiments.

In one or more embodiments, if the eye-protection parameters of the constituent window are preset values and the constituent window is not the constituent window corresponding to the fingerprint recognition, then performing synthetic calculations on the eye-protection parameters of the constituent window. In one or more embodiments, the synthesis calculations include Graphics Processing Unit GPU synthesis. In one or more embodiments, the method further includes calculating a color value of each one of fragments in a fragment shader according to the eye-protection parameters obtained by the synthesis calculations, and rendering a corresponding pixel point according to the color value of the fragment.

In one or more embodiments, the filtering module configured to if the eye-protection parameters of the constituent window are preset values and the constituent window is not the constituent window corresponding to the fingerprint recognition, then perform synthetic calculations on the eye-protection parameters of the constituent window. In one or more embodiments, the synthesis calculations include Graphics Processing Unit GPU synthesis. In one or more embodiments, the device further includes a rendering module configured to calculate a color value of each one of fragments in a fragment shader according to the eye-protection parameters obtained by the synthesis calculation, and render a corresponding pixel point according to the color value of the fragment.

It can be seen from the above technical solutions that the embodiments of this application have the following advantages.

The embodiment of the application provides an eye-protection mode processing method, device, terminal, and medium in fingerprint recognition mode. Since each of application programs corresponds to one or more constituent windows, when fingerprint recognition is started, eye-protection parameters of each of the constituent windows are detected in turn. If the eye-protection parameters of the current constituent window are preset values and the current constituent window is a constituent window corresponding to the fingerprint recognition, the eye-protection parameters of the constituent window corresponding to the fingerprint recognition are set to zero. Therefore, the embodiment of the present application can simultaneously turn on the eye-protection mode in the case of fingerprint recognition, avoiding the flickering of the screen of the mobile terminal which affects the continuous display of the eye protection function, when switching between the fingerprint recognition and the eye protection mode, and also eliminating the influence of the eye protection mode on fingerprint recognition, therefore ensures the accuracy of fingerprint recognition.

Those skilled in the art can clearly understand that, for the convenience and conciseness of the description, the specific working process of the above-described system, device, and module can refer to the corresponding process in the foregoing method embodiment, which will not be repeated here.

In the several embodiments provided in this disclosure, it should be understood that the disclosed system, device, and method may be implemented in other ways. For example, the device embodiments described above are merely illustrative. For example, the division of the modules is only a logical function division, and there may be other divisions in actual implementation, for example, multiple modules or components may be combined or can be integrated into another system, or some features can be ignored or not implemented. In addition, the displayed or discussed mutual coupling or direct coupling or communication connection may be indirect coupling or communication connection through some interfaces, devices or modules, and may be in electrical, mechanical or other forms. The modules described as separate components may or may not be physically separate, and the components displayed as modules may or may not be physical units, that is, they may be located in one place, or they may be distributed on multiple network units. Some or all of the modules can be selected according to actual needs to achieve the objectives of the solutions of the embodiments.

In addition, each functional module in each embodiment of the present disclosure may be integrated into one processing unit, or each module may exist alone physically, or two or more units may be integrated into one module. The above-mentioned integrated unit can be implemented in the form of hardware or software functional unit. If the integrated unit is implemented in the form of a software functional unit and sold or used as an independent product, it can be stored in a computer readable storage medium.

Based on this understanding, the technical solution of the present application or the part that contributes to the prior art or all or part of the technical solution can be embodied in the form of a software product, and the computer software product can be stored in a storage medium, which including several instructions to make a computer device (which can be a personal computer, a server, or a network device, etc.) execute all or part of the steps of the eye-protection mode processing method in the fingerprint recognition mode of the various embodiments of this disclosure. The aforementioned storage media may include U disk, mobile hard disk, read-only memory (ROM), random access memory (RAM), magnetic disk or optical disk and other media that can store program code.

It should be noted that the above embodiments are only used to illustrate the technical solutions of the present disclosure and do not to limit. Although the present application has been described in detail with reference to the foregoing embodiments, those of ordinary skill in the art should understand that the technical solutions recorded in the foregoing embodiments can be modified, or some of the technical features can be equivalently replaced, and these modifications or replacements do not cause the essence of the corresponding technical solutions to deviate from the spirit and scope of the technical solutions of the embodiments of the present disclosure.

What is claimed is:

1. An eye-protection mode processing method for a mobile terminal that is in a fingerprint recognition mode, the method comprising:
   acquiring eye-protection parameters of each one of current constituent windows when the mobile terminal is in the fingerprint recognition mode; and
   obtaining updated eye-protection parameters of the current constituent windows, by setting the eye-protection parameters of a constituent window corresponding to a fingerprint recognition as a value of zero and keeping the eye-protection parameters of other constituent windows except for the constituent window corresponding to the fingerprint recognition unchanged, so as to filter out the eye-protection parameters of the constituent window corresponding to the fingerprint recognition.

2. The eye-protection mode processing method in the fingerprint recognition mode according to claim 1, further comprising performing synthesis calculations on the updated eye-protection parameters of the current constituent windows, so as to obtain calculated eye-protection parameters of the current constituent windows.

3. The eye-protection mode processing method in the fingerprint recognition mode according to claim 2, wherein the synthesis calculations include Graphics Processing Unit (GPU) synthesis.

4. The eye-protection mode processing method in the fingerprint recognition mode according to claim 3, wherein the method further comprises:
   calculating a color value of each one of fragments in a fragment shader according to the calculated eye-protection parameters; and
   rendering a corresponding pixel point according to the color value of the fragment.

5. A mobile terminal, wherein the mobile terminal comprising:
   a processor; and
   a memory for storing at least one instruction,
   wherein the at least one instruction, when executed by the processor, causes the processor to:
   acquire eye-protection parameters of each one of current constituent windows when the mobile terminal is in a fingerprint recognition mode; and
   obtain updated eye-protection parameters of the current constituent windows, by setting the eye-protection parameters of a constituent window corresponding to a fingerprint recognition as a value of zero and keeping the eye-protection parameters of other constituent windows except for the constituent window corresponding to the fingerprint recognition unchanged, so as to filter out the eye-protection parameters of the constituent window corresponding to the fingerprint recognition.

6. The mobile terminal according to claim 5, wherein the processor is further configured to:
   perform synthesis calculations on the updated eye-protection parameters of the current constituent windows, so as to obtain calculated eye-protection parameters of the current constituent windows.

7. The mobile terminal according to claim 6, wherein the synthesis calculations include Graphics Processing Unit (GPU) synthesis.

8. The mobile terminal according to claim 7, wherein the processor is further configured to:
   calculate a color value of each one of fragments in a fragment shader according to the calculated eye-protection parameters; and
   render a corresponding pixel point according to the color value of the fragment.

9. A non-transitory computer-readable storage medium, wherein the computer-readable storage medium includes instructions that, when executed by one or more processors of a mobile terminal, causes the processors to implement an eye-protection mode processing method for the mobile terminal that is in a fingerprint recognition mode, the eye-protection mode processing method comprising:
   acquiring eye-protection parameters of each one of current constituent windows when the mobile terminal is in the fingerprint recognition mode; and
   obtaining updated eye-protection parameters of the current constituent windows, by setting the eye-protection parameters of a constituent window corresponding to a fingerprint recognition as a value of zero and keeping the eye-protection parameters of other constituent windows except for the constituent window corresponding to the fingerprint recognition unchanged, so as to filter out the eye-protection parameters of the constituent window corresponding to the fingerprint recognition.

10. The computer-readable storage medium according to claim 9, wherein the method further comprises:
performing synthesis calculations on the updated eye-protection parameters of the current constituent windows, so as to obtain calculated eye-protection parameters of the current constituent windows.

11. The computer-readable storage medium according to claim 10, wherein the synthesis calculations include Graphics Processing Unit (GPU) synthesis.

12. The computer-readable storage medium according to claim 11, wherein the method further comprises:
calculating a color value of each one of fragments in a fragment shader according to the calculated eye-protection parameters; and
rendering a corresponding pixel point according to the color value of the fragment.

* * * * *